June 26, 1923.

C. W. LARNER

PLUNGER VALVE

Filed Jan. 22, 1918

Inventor

Chester W. Larner.

By A. B. Stoughton

Attorney

Patented June 26, 1923.

1,459,774

UNITED STATES PATENT OFFICE.

CHESTER W. LARNER, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

PLUNGER VALVE.

Application filed January 22, 1918. Serial No. 213,171.

*To all whom it may concern:*

Be it known that I, CHESTER W. LARNER, a citizen of the United States, residing at Philadelphia, in the county of Philadelphia and State of Pennsylvania, have invented certain new and useful Improvements in Plunger Valves, of which the following is a specification.

This invention relates to pressure operated plunger bowl valves for operation with distributing systems in which the direction of fluid flow is in the direction of the closing movement of the plunger bowl.

Objects of the present invention are to improve the system of control and to provide for the automatic closing of the valve in the event of a break in the pipe line beyond the neck of the valve.

One embodiment of the invention is illustrated in the drawings accompanying and forming a part of this specification, wherein—

Figure 1:
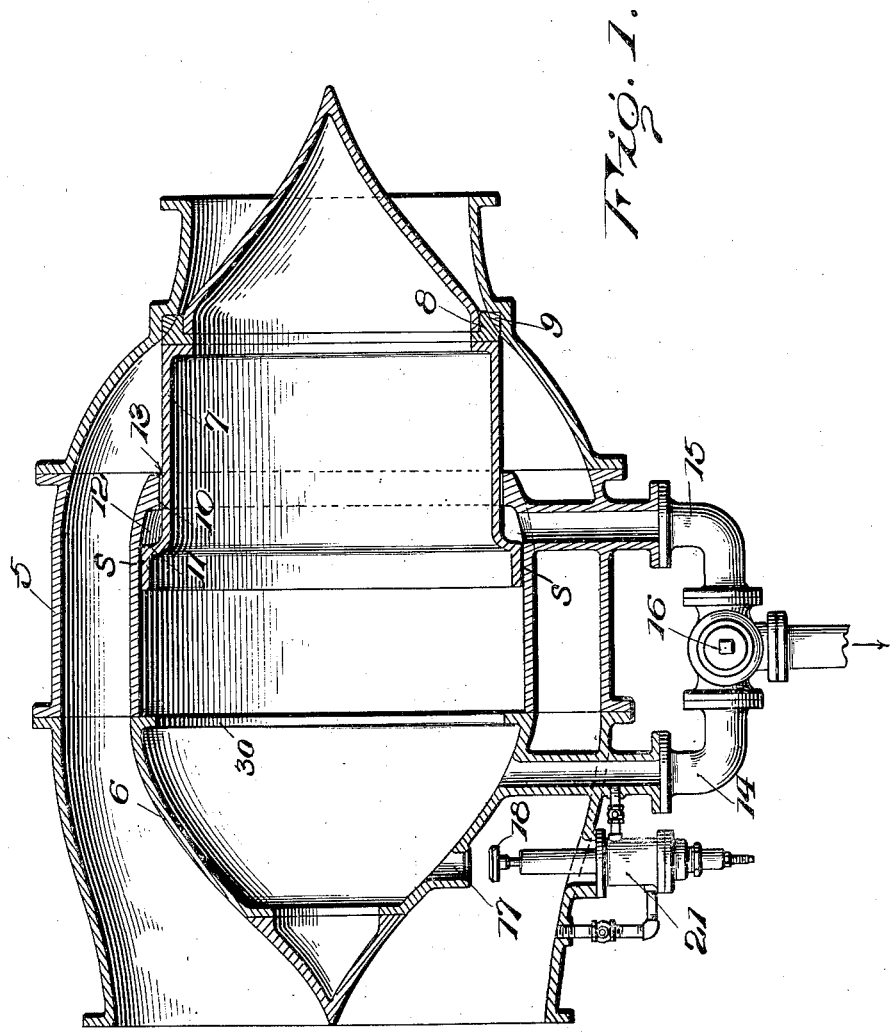
Figure 1 is a longitudinal sectional view of a hydraulic valve.
Figure 2:
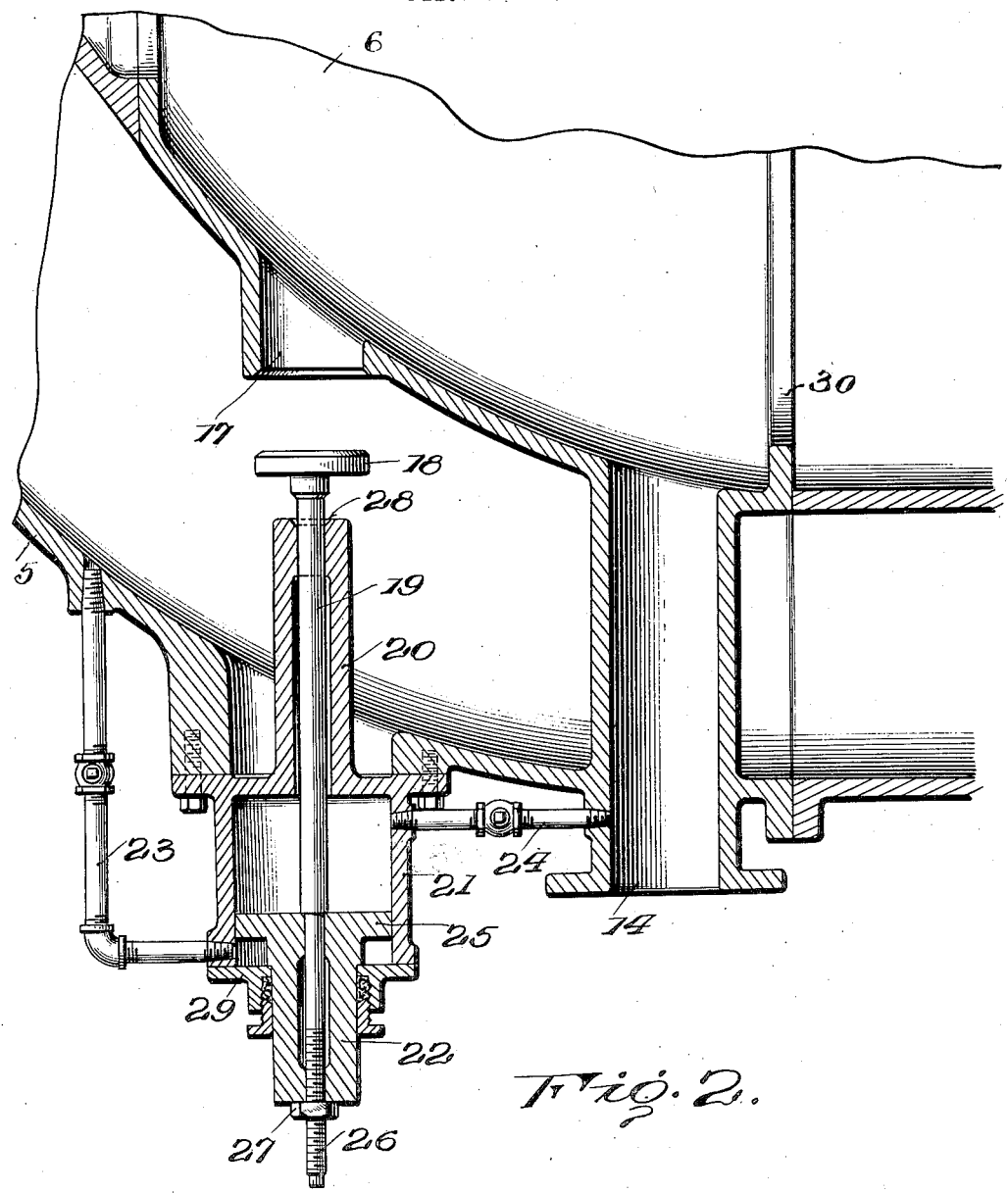
Fig. 2 is a sectional detail of the system of control.

Referring to the drawings, the numeral 5 represents a valve body or housing, which may be an enlargement of a conduit for fluids under pressure. 6 indicates a fixed hollow valve element, and 7 is its telescopic plunger bowl. The latter may be equipped, as is usual, with an annular seat 8 registering with a seat 9 on the wall of the valve body at the small end or neck thereof. As will be explained in the course of the following description, the fixed bowl 6 constitutes an operating chamber, hereinafter termed the "closing" chamber, for moving the plunger in the direction of its seat, and there is a separate and distinct operating chamber, hereinafter termed the "opening" chamber, for moving the plunger away from its seat when the "closing" chamber is exhausted.

The telescopic parts of the fixed and movable valve elements 6 and 7 are provided, respectively, with shoulders 10 and 11, whereby there is formed an annular space or chamber 12, which is the "opening" chamber previously mentioned. The operating chamber 12 receives pressure from the fluid-way of the valve body through the clearance space 13 around the plunger. Inasmuch as the plunger is not packed, the clearance indicated will admit of sufficient leakage from the fluid-way to the chamber 12 to move the plunger away from the seat 9 when the closing chamber 6 is exhausted. Under such conditions it is evident that the shoulder 11 constitutes an abutment on the plunger bowl and shifts the latter in response to leakage pressure.

The operating chambers 6 and 12 are provided with and controlled by means of exhaust connections 14 and 15 leading to a three-way valve 16, which may open to atmosphere.

The plunger 7 is closed by exhausting pressure from the opening chamber 12 and supplying pressure to the closing chamber 6. The latter condition is met by providing the closing chamber with an auxiliary port 17, which, when open, serves to transmit pressure from the fluid-way of the valve body 5 to said closing chamber. This function of the port 17 is additionally important because in the event of a break in the pipe line beyond the neck of the valve, the pressure externally of the nose of the plunger would drop and pressure would automatically be supplied through port 17, thus causing the plunger to close.

Port 17 is controlled by a disk valve 18, the stem 19 of which extends through a tubular projection or guide 20 on a cylinder 21, to a differential piston 22. The outer end of the cylinder is supplied with constant pressure from the fluidway of the valve body 5 through a valved pipe connection 23. The other end of the cylinder is connected by a valved pipe 24 to the exhaust passage 14 leading from closing chamber 6 to the three-way control valve 16.

In the normal operation of the valve it is opened by moving the valve 16 to open pipe 15 and close pipe 14, thus connecting the annular chamber with atmosphere or low pressure and permitting high pressure to enter through port 17, which is normally open.

If the plunger 7 is closed and it is desired to open it, the pressure in the closing chamber is exhausted through the medium of its exhaust channel 14, and since the latter is connected to the cylinder 21, the pressure above the piston head 25 is likewise exhausted. The effect of this is that pressure admitted below the piston head causes it to move and operate the valve 18. The port 17 is thus automatically closed and does not interfere with the discharge of pressure from the closing chamber 6, as it otherwise would. The pressure in chamber 6 being thus reduced, the plunger is caused to open in response to pressure in the opening chamber 12, which pressure is supplied as already explained through the leakage space 13.

Thereupon the pressure in pipe 14 will build up sufficiently to unbalance the piston 25 and open passage 17, the pressure from chamber 12 being transmitted to the closing chamber 6 preferably through a slight clearance space at s around the enlarged end of the plunger bowl which is sufficiently loose to permit leakage to equalize the pressures in these two chambers 12 and 6 when the valve 16 is in position to close pipes 14 and 15.

After either opening or closing the plunger the control valve 16 is restored to neutral position, that is with all ports closed.

The valve stem 19 is screw-threaded as at 26 and is provided with a nut 27, which affords provision for adjusting the lift of the disk valve 18. This is desirable because the rate of closing of the plunger 7 depends upon the rate at which pressure may enter the closing chamber through the port 17. It is necessary, in order to prevent water hammer, that the plunger should not close too rapidly, and this may be prevented by throttling port 17 through the medium of valve 18.

The beveled seat 28 at the end of guide 20 is for the purpose of preventing leakage around the piston rod when the cylinder head 29 and piston 22 are removed for repairs. In such event, the pressure in the fluid-way of the valve body 5 will force the disk valve 18 against said beveled or ground seat.

The flange 30 on the wall of the closing chamber acts as a stop for limiting the backward travel of the plunger 7.

Having described the nature and objects of the invention, I claim:—

1. A valve comprising the combination of a body, a fixed hollow valve element spaced from the body to afford a fluid way and having an opening to the fluid way, a hollow plunger valve element adapted to co-operate with the body as a seat and forming with the fixed element an internal chamber and an annular chamber communicating by leakage with the fluid way, a valve means and its connections for exhausting the internal and annular chambers to open and close the valve, a closure for said opening, and differential piston and cylinder means and their connections responsive to exhaust from the internal chamber and adapted to seat the closure when the internal chamber is exhausted and to unseat it at other times, substantially as described.

2. A valve comprising the combination of a body, a fixed hollow valve element spaced from the body to afford a fluid way and having an opening to the fluid way, a hollow plunger valve element adapted to co-operate with the body as a seat and forming with the fixed element an internal chamber and an annular chamber communicating by leakage with the fluid way, means for exhausting the internal and annular chambers to open and close the valve, and closure mechanism for said opening responsive to exhaust from the internal chamber and adapted to seat the closure when the internal chamber is exhausted and to unseat it at other times, substantially as described.

3. In a valve comprising a body, a fixed hollow valve element spaced from the body to afford a fluid way, a hollow plunger valve element adapted to co-operate with the body as a seat and forming with the fixed element an internal chamber and an annular chamber, and in combination therewith, a communication stopping short of the body and provided through the wall of the fixed element only and between the fluid way and said internal chamber whereby pressure is supplied to said internal chamber to close the plunger element to its seat when pressure beyond the plunger falls as by leakage due to a break, substantially as described.

4. Closure mechanism for a conduit having an annular passage comprising a plunger valve moving across said passage and having a piston member with pressure chambers on opposite sides thereof, a leakage connection between one of said chambers and the conduit pressure, a valve connection between the other of said chambers and the conduit, and a separate valve means for controlling the pressures in said chambers to move the plunger valve and hold it in desired adjustment comprising means for automatically actuating said valve connection to one of said chambers.

5. Closure mechanism for a conduit having an annular passage comprising a plunger valve moving across said passage and having a piston member with pressure chambers on opposite sides thereof, an open connection between one of said chambers and the conduit pressure, a valve connection between the other of said chambers and the conduit, and a separate valve means for controlling the pressures in said chambers to move the plunger valve and hold it in desired adjustment comprising means for automatically actuating said valve connection to one of said chambers.

6. Closure mechanism for a conduit having an annular passage comprising a plunger valve moving across said passage and having a piston member with pressure chambers on opposite sides thereof, a supply connection between each of said chambers and the conduit pressure, and separate valve connections including a separate automatically movable valve for controlling the pressure in said chambers to move the plunger valve and hold it in desired adjustment.

7. Closure mechanism for a conduit having an annular passage comprising a plunger valve moving across said passage and having a piston member with pressure chambers on opposite sides thereof, a connection between each of said chambers and the conduit pressure, and separate valve connections for controlling the pressure in said chambers to move the plunger valve and hold it in desired adjustment comprising means for automatically controlling the connection to one of said chambers.

8. Closure mechanism for a conduit having an annular passage comprising a plunger valve moving across said passage and having a piston member with pressure chambers on opposite sides thereof, a supply connection between each of said chambers and the conduit pressure, and separate valve connections including a separate automatically movable valve for controlling the pressure in said chambers to move the plunger valve and hold it in desired adjustment comprising means for exhausting the pressure being supplied to one of said chambers.

9. Closure mechanism for a conduit having an annular passage comprising a plunger valve moving across said passage and having a piston member with pressure chambers on opposite sides thereof, supply connections within said conduit between said chambers and the conduit pressures, and separate exhaust valve connections from said chambers for controlling the pressure in said chambers to move the plunger valve and hold it in desired adjustment.

10. Closure mechanism for a conduit having an annular passage comprising a plunger valve moving across said passage and having a piston member with pressure chambers on opposite sides thereof, a connection between one of said chambers and the conduit pressure comprising a valve seat, a valve member moved against said seat by said conduit pressure, and means for controlling said pressure to seat said valve comprising separate valve means connected with one of said chambers.

11. Closure mechanism for a conduit having an annular passage comprising a plunger valve moving across said passage and having a piston member with pressure chambers on opposite sides thereof, a valve connection between one of said chambers and a point of low pressure, another valve connection from said chamber to the conduit pressure, and fluid pressure operated means whereby the actuation of one of said valves will automatically move the other valve in coordination therewith.

In testimony whereof I affix my signature.

CHESTER W. LARNER.